March 18, 1930. E. C. KARIBO ET AL 1,751,276
POWER MECHANISM FOR CONTROLLING THE REVERSE GEARS OF LOCOMOTIVES
Filed Oct. 9, 1920 6 Sheets-Sheet 3

WITNESS
Gustav Genzlinger.

INVENTORS:
Edmond C. Karibo
Edwin S. Pearce
Raymond W. Retterer
By Cyrus N. Anderson
ATTORNEY.

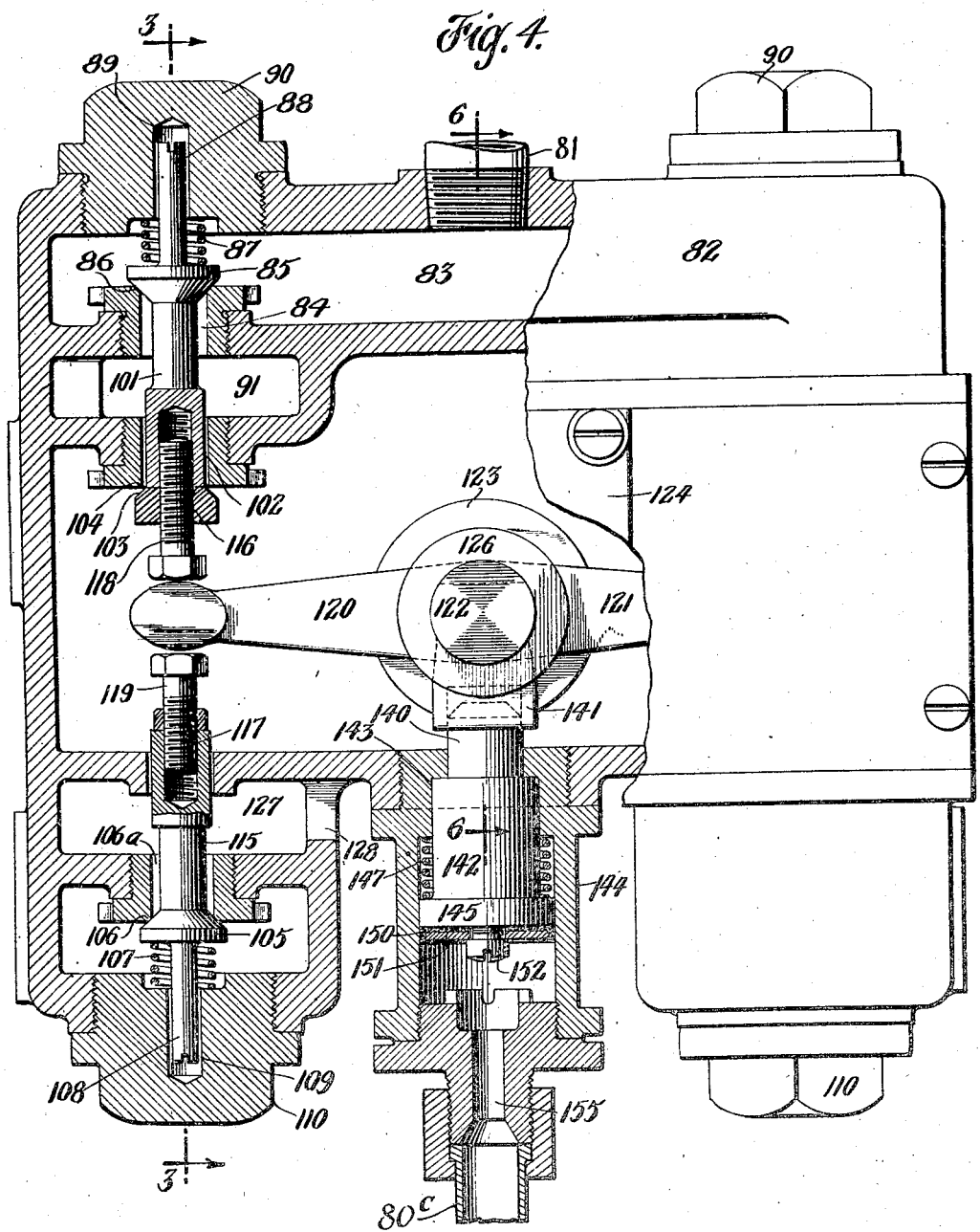

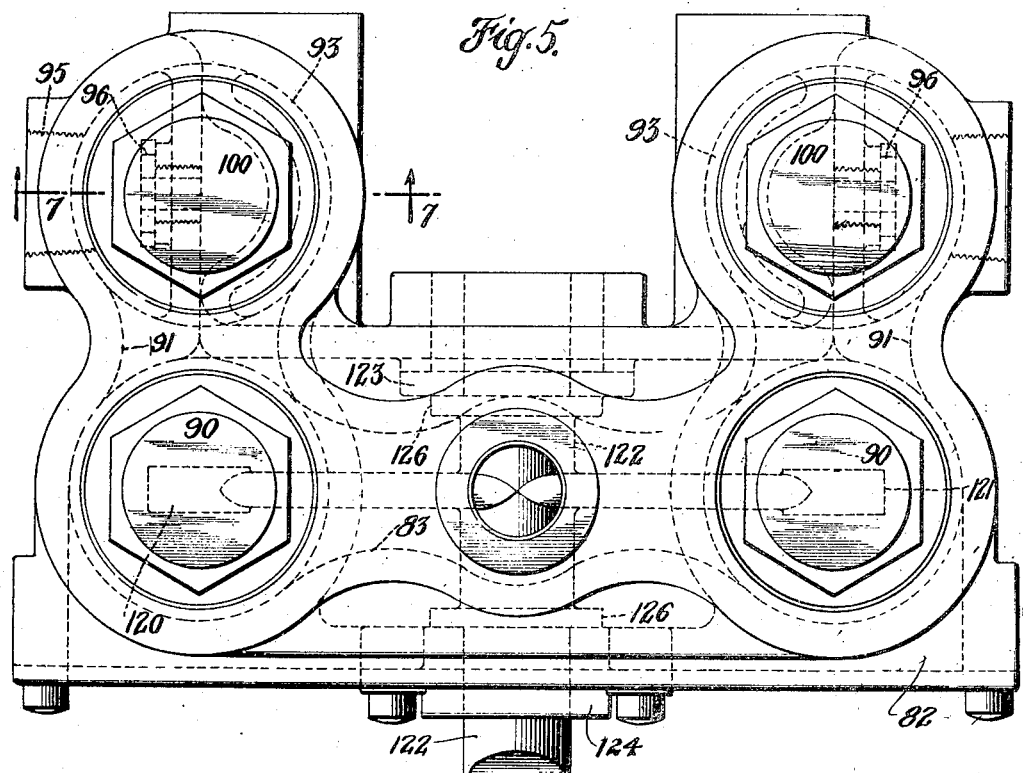
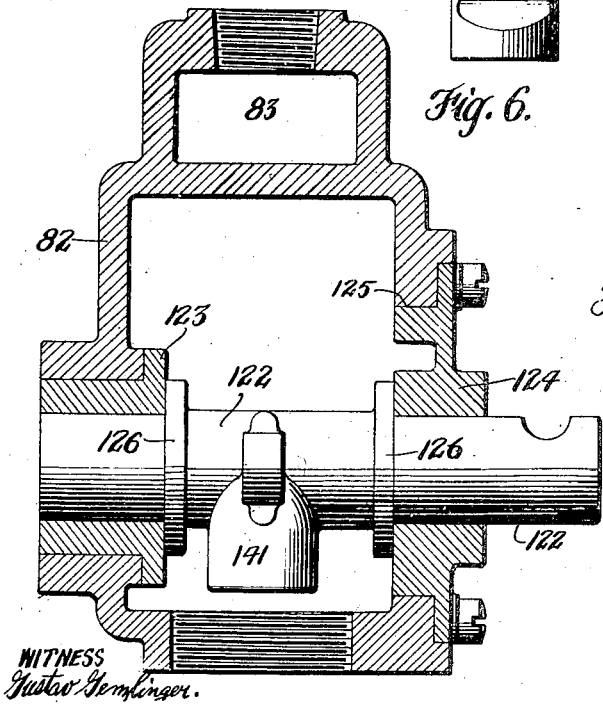
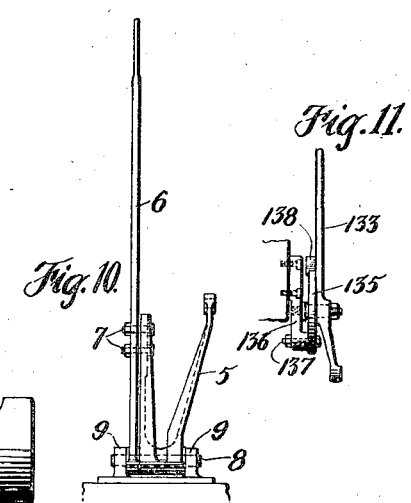

March 18, 1930.  E. C. KARIBO ET AL  1,751,276
POWER MECHANISM FOR CONTROLLING THE REVERSE GEARS OF LOCOMOTIVES
Filed Oct. 9, 1920   6 Sheets-Sheet 6
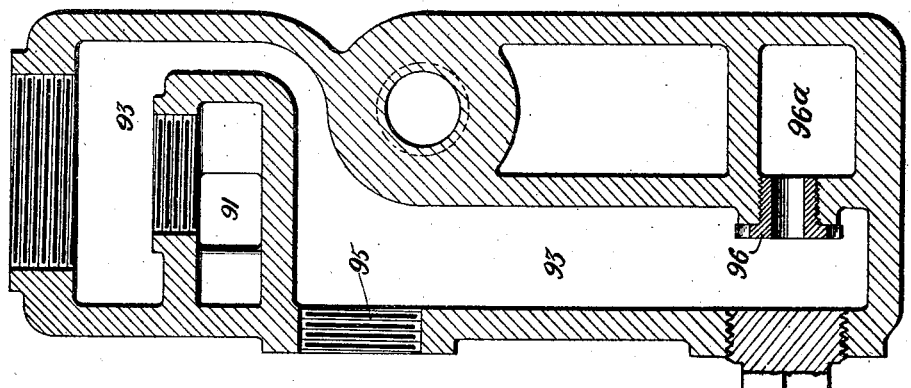
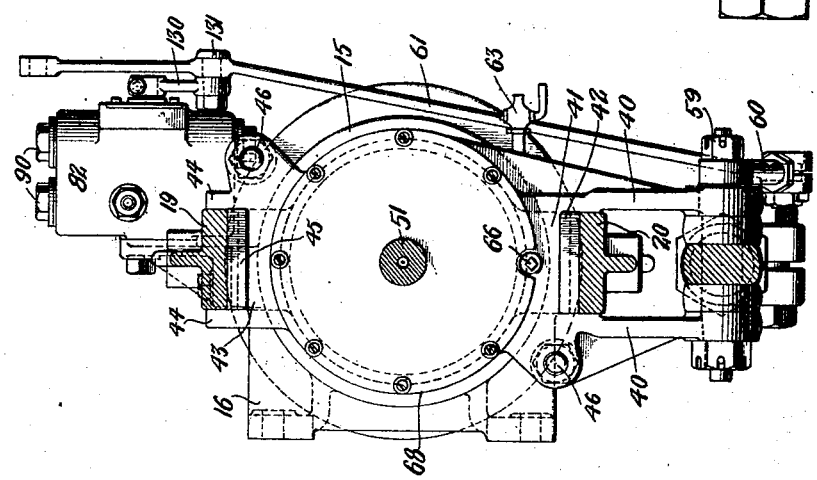
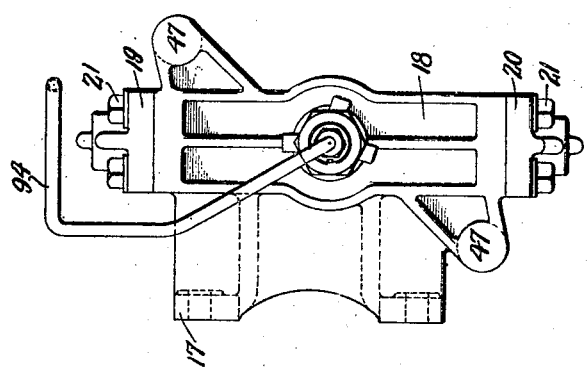

Patented Mar. 18, 1930

1,751,276

UNITED STATES PATENT OFFICE

EDMOND C. KARIBO, EDWIN S. PEARCE, AND RAYMOND W. RETTERER, OF INDIAN-APOLIS, INDIANA, ASSIGNORS TO TRANSPORTATION DEVICES CORPORATION

POWER MECHANISM FOR CONTROLLING THE REVERSE GEARS OF LOCOMOTIVES

Application filed October 9, 1920. Serial No. 415,864.

Our invention relates to power mechanism adapted for actuating and controlling the reverse gear of a locomotive and for other purposes and it has for its object generally to provide a device or apparatus of the character indicated which combines simplicity of construction with a high degree of efficiency.

Other and more specific objects of our invention are: to provide a power mechanism which is adapted for application to locomotives already supplied with standard reverse gear mechanism in which the reverse shaft arm is operated by means of a manually operable reverse lever; to provide a construction in which there is no possibility of leakage between the oppositely disposed and co-acting cylinders or chambers which are adapted to receive the compressed actuating fluid, such as air or steam; to provide means whereby the leakage of fluid from said chambers to the exterior thereof is reduced to a minimum if not entirely eliminated; to provide means whereby a movable power transmitting part of the power mechanism may be connected to the reach bar or rod of the present standard construction of reverse gear, which rod extends from the manually operable reverse lever to the reverse shaft arm without disturbing the continuity of said bar or rod; to provide means whereby either the power actuated reverse or manually operable reverse means may be employed, as may be desired; and also to provide means whereby the valves for controlling the ingress and egress of the actuating fluid to and from the chambers previously referred to may be readily adjusted to secure accuracy of operation or for other purposes as hereinafter will be set forth.

We have not, in the foregoing statement, undertaken or intended to set forth all of the objects of our invention or the advantages incident thereto. Other objects and advantages thereof will be pointed out in the detailed description which follows or will be apparent from such description.

In order that our invention may be more readily understood and its practical advantages fully appreciated, reference may be had to the accompanying drawings in which one convenient form of embodiment thereof is shown. It will be understood by those skilled in the art that our invention is susceptible of embodiment in other forms of construction than that shown and, therefore, that we desire to include all forms of construction, within the scope of the claims, appended hereto, which embody and make use of the principle of our said invention.

In the drawings:

Fig. 4 is a view partly in side elevation and partly in vertical section of the said valve control mechanism, the sectional portion being taken along the line 4—4 of Fig. 3;

Fig. 5 is a top plan view of the valve casing or body of our invention, portions of the interior of the valve construction being indicated in dotted lines.

Fig. 6 is a transverse sectional view taken on the line 6—6 of Fig. 4;

Fig. 7 is a sectional view taken on the line 7—7 of Fig. 5;

Fig. 8 is a transverse sectional view taken on the line 8—8 of Fig. 2;

Fig. 9 is an end view of the apparatus shown in Fig. 2 looking toward the right in said figure;

Fig. 10 is a view in rear elevation of the reverse lever and reverse lever arm; and Fig. 11 is a rear view of the power reverse lever, the support therefor and the circular quadrant associated and co-operating therewith.

Figure 1:
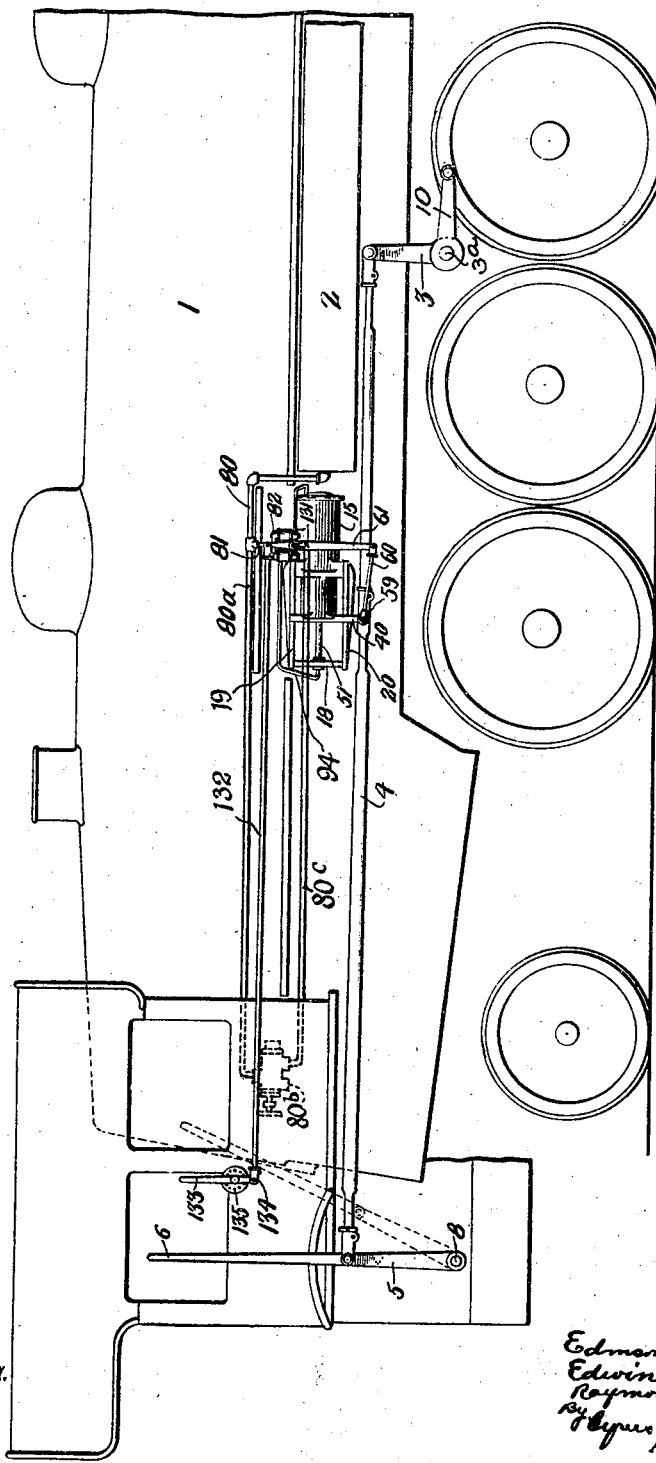
Fig. 1 is a view in side elevation of a portion of a locomotive and showing our invention applied thereto, the apparatus embodying our said invention being depicted in side elevation.

Referring to the drawings: 1 designates a portion of a locomotive and 2 a portion of a container for containing or holding compressed air or the like. The reverse shaft arm 3 projects upwardly from a reverse shaft 3ª and is connected by means of a reach rod, designated as a whole by the reference numeral 4, to the reverse lever arm 5 connected to a manually operable reverse lever 6 by means of the nuts and bolts 7. The reverse lever arm 5 and the reverse lever 6 are mounted co-axially upon a pivot 8 supported in bracket lugs 9, as shown in Fig. 10. The reverse shaft 3ª is provided with horizontally extending arms 10 (only one of which is shown) which are connected in any desired known manner to the link blocks (not shown).

Figure 2:
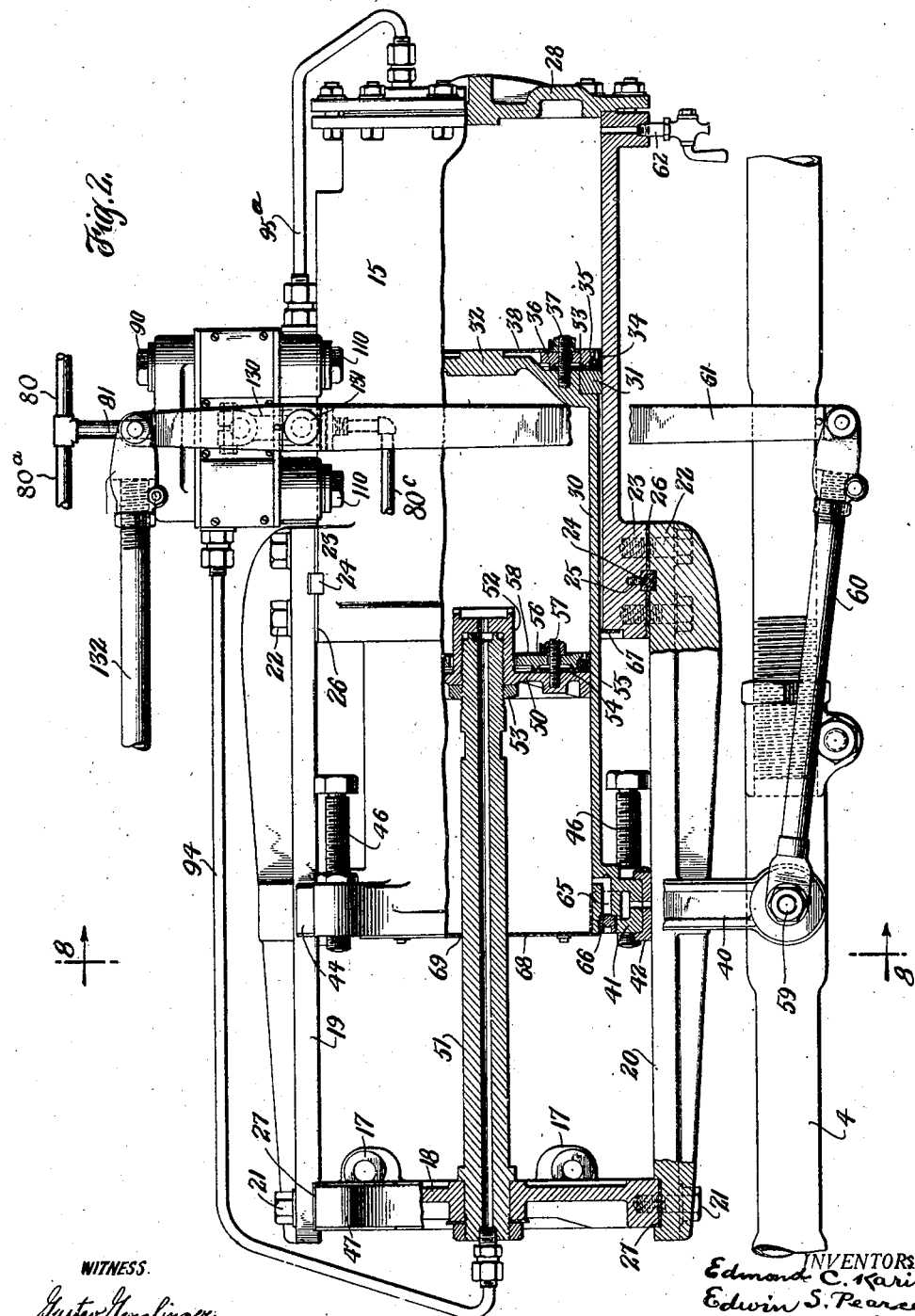
Fig. 2 is a view partly in vertical longitudinal section and partly in side elevation of a portion of the apparatus embodying our invention.

15 designates a cylinder secured by means of brackets 16 and 17 to a convenient portion of the locomotive structure 1. The first of these brackets is formed upon the cylinder 15 while the latter, 17, are formed upon a spreader 18 situated between and secured to the outer ends of guides 19 and 20 by means of securing bolts 21. The forward ends of these guides are secured in diametrically opposed relation upon the opposite sides of the rear end of the stationary cylinder 15, as shown in Fig. 2, and are secured thereto by means of screw threaded bolts 22 which engage enlarged or thickened portions 23 formed upon the said cylinder. As an additional means for resisting any shearing stresses or strains which may be imposed upon the guides 19 and 20 keys 24 are interposed between the said guides 19 and 20 and the enlarged or thickened portions 23 of the cylinder 15. These keys engage slots or notches in the guides and in the enlarged or thickened portions, as shown at the lower side of Fig. 2, and are retained in position by means of cap screws 25.

The guides 19 and 20 are rendered adjustable with respect to each other by means of the spacer strips 26 and 27, the former being situated between the forward ends of the said guides and the portions of the cylinder 15 to which they are connected, and the latter between the ends of the spreader 18 and the adjacent end portions of the said guides. By varying the thickness of these spacer strips or by removing them altogether, the distance between the said guides may be varied to compensate for the wearing of the portion of the mechanism which slidably engages the same as will be hereinafter described.

The forward end of the cylinder 15 is hermetically closed or sealed by means of a head 28 which may be secured thereto in any desired known manner.

30 designates a floating cylinder supported by means of a bull ring 31 at its forward end in the relatively stationary cylinder 15 and at its rear end upon the guides 19 and 20. Preferably the head 32 of the floating cylinder 30 is integral with the sides thereof as shown, although the said head may be formed separately and connected to the end of the said cylinder to form an air tight joint therewith. The bull ring 31 is seated in an annular seat formed in the outer peripheral edge of the head 32.

In order to form an air tight fit between the forward end of the cylinder 30 and the interior surface of the stationary cylinder 15, we have provided an annular packing 33 of leather or other suitable material, the outer edge of which is turned forwardly as indicated at 34 and is seated against the interior surface of the said stationary cylinder. The expander ring 35 is situated in the angle formed by the forwardly extending portion 34 and the said ring and leather packing are retained in place by means of an annular follower 36 the latter being retained by means of screw threaded bolts and nuts 37, one of which is shown in Fig. 2 of the drawings. The nuts last referred to are retained in position by the forwardly extending annular flange of a circular plate 38 secured to the forward side of the head 32 of the cylinder 30.

At its rear end the floating cylinder 30 is provided with depending arms 40 which arms are situated upon opposite sides of the guide 20. Interposed between the upper portions of these arms and integral therewith and with the cylinder 30 is a portion or web of material 41 and interposed between the lower side of the latter and the guide 20 is a wear plate 42 the under side of which rests upon the upper side of the guide 20.

A similar projection 43 is provided at the opposite side of the rear end of the cylinder 30 which projection is provided with lugs 44 at the opposite sides thereof, which lugs are situated upon the opposite sides of the upper guide 19. Interposed between the latter guide and the upper side of the projection 43 is a wear plate or block 45 similar to the wear plate or block 42.

In order to regulate and limit the extent of the rearward movements of the floating cylinder 30 in the stationary cylinder 15, we have provided adjustable screw threaded contact bolts 46, the rear ends of which are adapted to contact with stops 47 upon the spreader 18. The forward movements of the floating cylinder are limited by contact of the forward end thereof with the head 28 of the stationary cylinder 15.

A stationary piston 50 is provided for the floating cylinder 30, which piston is connected with a stationary piston rod 51 supported at its rear end upon the spreader 18 as shown in Fig. 2. The forward end of the piston rod 51 is in screw threaded engagement with the interior of a hollow boss 52 which projects forwardly from the piston or plate 50 and is held in locked relation with respect thereto by means of a lock nut 53. In order that the piston structure may form air tight engagement with the interior of the floating cylinder 30, we have provided the packing 54 of leather or other suitable material, the expander ring 55 and the annular follower 56, all of which are retained in place by means of the screw threaded bolts and nuts 57, only one of which is shown. The nuts are held in place and against accidental displacement by means of the annular flange upon the circular nut lock plate 58. These parts, 54, 55, 56, 57 and 58 are substantially identical with the parts 33, 35, 36, 37 and 38 previously referred to.

The depending arms 40 are connected by means of a bolt 59 to the reverse lever reach rod 4 and also by means of a link bar 60 to the lower end of a floating lever 61 which operates in the manner and for the purpose hereinafter described.

For the purpose of draining from the stationary cylinder 15 water or other liquid which may collect therein, we have provided the cock 62. A similar cock 63 is provided for draining off the water or any other liquid which may collect in the floating cylinder 30 forwardly of the stationary piston 50.

For the purpose of draining out water or other liquid which may collect in the rear portion of the floating cylinder 30 in rear of the piston 50, we have provided the opening 65 which is closed by means of a screw threaded plug 66. In order to exclude dust from the cylinder 15 we have provided the flat dust ring 67 the inner edge of which is seated closely against the outer surface of the floating cylinder 30, and in order to exclude dust from the latter cylinder, we have provided the dust plate 68 provided with a central opening 69 the edges of which fit closely against the surface of the stationary or fixed piston rod 51.

For the purpose of operating the floating cylinder 30 we preferably employ compressed air which is obtained from the container 2 previously referred to. It will be understood, however, that any other suitable fluid, such as steam, may be employed instead of air.

If compressed air is employed any suitable means, not shown, may be employed for supplying it under compression to the tank or container 2.

For the purpose of controlling the supply of air or other similar fluid under compression to the cavities or chambers upon the opposite sides of the forward closed end 32 of the cylinder 30 to actuate the latter, we have provided a valve and other mechanism which will now be described.

The operating fluid, as air, is supplied by means of a pipe 80 and branch pipe 81 from the tank 2 to the valve body or casing 82. The air or other fluid under compression is delivered to a passageway or conduit 83.

Figure 3:
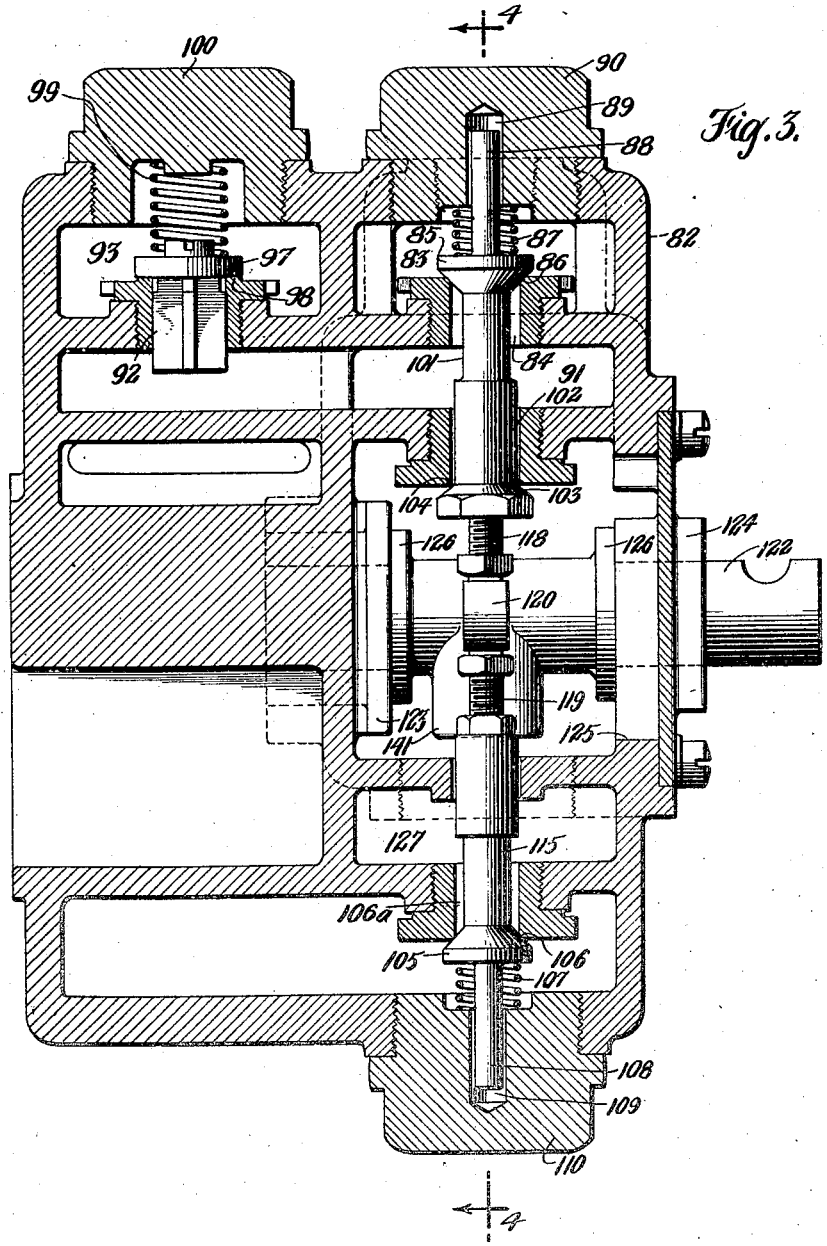
Fig. 3 is a vertical transverse sectional view taken on the line 3—3 of Fig. 4 and showing details of construction of a portion of the valve mechanism of our invention.

Before describing the valve control mechanism it will be noted that the valve structure shown at the left hand side of Fig. 4 is duplicated at the right hand side thereof. Hence a description of the valve structure and passageways shown in Figs. 3, 4 and 7 will be understood to apply to a corresponding valve control mechanism at the opposite side of the structure from the valve mechanism shown in Fig. 4.

The passage of the air or other fluid from the passageway 83 through passageways 84 is controlled by valves 85 seated against the valve seats 86. The said valves are held in depressed or closed position by means of coiled springs 87 which surround extensions 88 from the valves which extensions project into openings 89 formed in removable plugs 90. These springs are interposed between the inner ends of these plugs and the outer ends or sides of the valves 85. From the passageways 84 the air or other fluid under compression enters passageways 91 and thence through passageways 92 into chambers or passageways 93. From one of these passageways, which will be designated the rear passageway, a pipe or conduit 94 leads to and connects with the passageway through the stationary piston rod 51, the said passageway continuing through the forward end of the hollow boss 52. The pipe 94 is connected with the port or opening 95 in the valve casing 82. From the other of these chambers or passageways 93, which will be referred to as the front chamber or pasageway, a pipe or conduit 95ᵃ leads to the front end of the stationary cylinder 15 and is in communication with the interior thereof. These pipes or conduits 94 and 95ᵃ serve the function not only of conveying the air or other fluid to the chambers or cavities in the cylinders 30 and 15 upon opposite sides of the head or end 32 of the cylinder 30, but also of conveying or exhausting the air or other fluid from these chambers in reverse direction back to the chambers or pasageways 93, from which it flows through the choke fittings or plugs 96 to the chambers or pasageways 96ᵃ. It will be noted that the pipe or conduit 95ᵃ is connected to the valve casing at a point below the point of connection of the pipe or conduit 94 thereto. It will be understood, however, that the pipe 95ᵃ may be connected to an opening at a point higher up upon the valve casing 82, as for instance in alinement with the pipe 94. Return flow of the compressed air or other fluid from the chambers 93 through the passageways 92 is prevented by means of check valves 97 which are seated against valve seats 98. These check valves are held upon their seats by means of coiled springs 99 the outer ends of which extend into and abut against seats formed in the inner ends of plugs 100. The valves 85 are provided with extensions 101 which extend through portions of chambers 91 and through passageways 102 and their lower ends are provided with valves 103 which are adapted to engage valve seats 104 to close the passageways 102 when the valves 85 are moved into open position to permit the passage of air or other fluid into the passageways 91. The valves 85 control the inlet of the air or other fluid under compression to the pipes or conduits 94 and 95ᵃ.

Outlet valves 105 are provided for controlling the outlet of air or gas from the cylinders 15 and 30. These valves co-operate with valve seats 106 to close the passageways 106ᵃ and are held in closed position against their seats by means of coiled springs 107 which surround extensions 108 which extend outwardly into holes 109 formed in plugs 110 secured in screw threaded openings in the valve casing 82, as shown. The inner ends of these springs are seated against the outer ends or sides of the valves 105 while the outer ends thereof are positioned in seats formed in the inner ends of the plugs 110. These valves 105 are each provided with extensions 115 which are in alinement with and extend toward the extensions 101 of the valves 85. Both the extensions 101 and 115 are provided with screw threaded openings 116 and 117 in which adjustable screws 118 and 119 are fitted. The inner ends of these screws are situated on opposite sides of the outer ends of arms 120 and 121 which project from the pivoted shaft 122, the said arms being situated 180° apart as shown. The shaft 122 is pivotally supported at one end in a bushing 123 provided in an opening in one side of a portion of a casing 82 and at its opposite end in an opening in a dust plate 124 which closes a relatively large opening 125 in the said casing. The shaft 122 is retained in proper position by means of flange collars 126 which are seated against the inner sides of the bushing 123 and the dust plate 124. The means for and manner of operating the shaft 122 will be hereinafter described, but assuming that the same has been rotated in an anti-clockwise direction, having reference to Fig. 4 of the drawings, it will be seen that the valve 105 will be depressed through the action of the arm 120 and it will be understood that at the same time the arm 121 actuates the inlet valve 85 which controls the flow of air or other fluid to the pipe or conduit 95ᵃ. The opening of the outlet valve 105 which controls the flow of air or other fluid from the floating cylinder 30 permits the air or other fluid to flow therefrom, through the pipe 94, the rear passageway 93, rear choke fitting 96 and rear passageways 96ᵃ and 106ᵃ into the rear chamber or passageway 127 and thence to the air through the rear exhaust opening 128. The escape of the air or other fluid from the floating cylinder 30 permits movement of the said cylinder to the rear; that is away from the closed end or head of the cylinder 15, as the air or other fluid under pressure flows into the said cylinder 15 through the pipe 95ᵃ.

If the shaft 122 were turned in the opposite direction exactly the reverse operation would be effected; that is, the air or other gas would escape from the cylinder 15 in front of the floating cylinder head 32 while air or other fluid under compression would flow through the pipe 94 into the floating cylinder 30 and cause forward movement thereof. Movement of the floating cylinder actuates the reach rod 4.

For the purpose of effecting operation of the shaft 122 it is provided with a depending arm 130 to the lower end of which the floating valve control lever 61 is pivotally connected by means of a pivot bolt 131. As previously described, the lower end of this lever is connected by means of the link 60 to the lower ends of the arms 40 which are integral with the floating cylinder 30. The upper end of this lever is connected by means of a power reverse reach rod 132 to one end of a power reverse lever 133, as indicated at 134.

The power reverse lever is pivoted concentrically with a circular quadrant 135 and both are supported upon a bracket 136 secured upon any portion of the locomotive or cab structure which may be convenient to the engineer or other person stationed in the cab. The circular quadrant 135 is adapted to be secured in stationary position; that is, against rotation, by means of a bolt 137. The power reverse lever 133 is adapted to be held in different positions with respect to the circular quadrant 135 by means of a latch 138 of any suitable or desired known construction.

When the power mechanism for actuating the reverse gear of a locomotive is being employed the reverse lever 6 is disconnected from the reverse lever arm 5 so that the latter may oscillate or swing by reason of its connection with the reach rod 4 independently of the said lever 6.

On the other hand, in case it should be desired to manually operate the reverse gear mechanism by means of the reverse lever 6 the connection of the latter with the reverse lever arm 5 is maintained, while the bolt 137 which holds the circular quadrant 135 against rotation is removed so as to permit said quadrant to oscillate under the influence of the power reach rod 132. In such case it is also necessary to so adjust the adjustable screws 119 with respect to the outer contact end portions of the arms 120 and 121 that the outlet valves 105 will be held constantly open, so as to permit reciprocating movement of the floating cylinder 30 under the influence of the reverse lever reach rod 4. At such time it is necessary to hold or retain the arms 120 and 121 in fixed position. In order to hold the arms 120 and 121 in fixed position, we have provided a plunger 140 which is adapted to engage a socket 141 formed upon one side of the shaft 122. The plunger 140 is provided with an enlarged portion 142 which fits closely but movably an opening 143 formed in the inner end portion of a tubular member 144. The outer end of the portion 142 is provided with a flange portion 145 against the inner edge of which the outer end of a coiled spring 147 contacts, the inner end of said spring contacting with the inner end portion of the tubular member 144. The spring 147 operates normally to hold the plunger 140 out of engagement with the socket 141 so as to permit rotation or pivotal movement of the shaft 122 when the power reverse mechanism is being used.

A packing 150 of leather or other suitable material is secured against the outer end of the plunger 140 and is held in place with its outer edges seated against the interior surface of the tubular member 144 by means of a follower 151, both the leather packing and follower being secured to and held in place against the outer end of the plunger by means of a cap screw 152. When it is desired to force the plunger 140 inwardly to engage the socket 141 air or other fluid under pressure is admitted through the opening 155 into the interior of the tubular member 144 and its action upon the outer end of the plunger forces the latter inwardly. This air or other fluid may be derived from any suitable source, as from the tank 2 through a pipe not shown.

If for any reason it should be desired to adjust the adjustable screws 118 and 119, the plunger 140 should be moved into engagement with the socket 141. This plunger will hold the arms 120 and 121 in fixed positions while the screws 118 and 119 are being adjusted, and if it is desired to either temporarily or permanently discontinue the use of the power mechanism for actuating the reverse gear the plunger 140 should be left temporarily or permanently in engagement with the socket 141 and the adjustable screws 119 adjusted with relation to the arms 120 and 121 so as to hold the outlet valves 105 temporarily or permanently in open position so as to permit free reciprocatory movements of the floating cylinder 30.

As already indicated, when the power mechanism for actuating the reverse gear is being used or employed the ordinary manually operable reverse lever 6 is disconnected from the reverse lever arm 5. Upon moving the power reverse lever 133 in one direction or the other, pivotal movement of the valve control lever 61 in corresponding directions about its connection with the link 60 as a pivot is effected, which by reason of its connection intermediate its ends with the arm 130 causes reverse or opposite pivotal movement of the shaft 122. Upon movement of the power reverse lever 133 rearwardly the lower end thereof is moved forwardly and by reason of the connection of such lower end through the power reverse reach rod 132 with the upper end of the valve control lever 61, causes forward movement of the latter about its connection with the link 60 as a pivot. Such forward movement of the lever 61 by reason of its connection with the lower end of the arm 130 causes anti-clockwise movement of the shaft 122. When such movement of the shaft is effected the arm 120 moves downwardly against the adjustable screw 119 and causes the valve 105 to open, thereby permitting air or other fluid to exhaust from the floating cylinder 30. At the same time the arm 121 moves upwardly and effects opening of the forward inlet valve to permit air or other fluid under compression to flow into the stationary cylinder 15 in front of the head 32 of the floating cylinder 30. As has already been described, the latter moves rearwardly effecting, through the arms 40 and the reach rod 4 to which the latter are connected, pivotal movement of the reverse shaft arm 3 in a direction to lift the link block (not shown). Rearward movement of the cylinder 30 continues until the lever 61 reaches normal position. Movement of lever 61 to this position returns the arms 120 and 121 to normal position so that the front inlet valve and rear outlet valve previously opened by the manual operation of the power reverse lever are permitted to return to closed position. Movement of the power reverse lever in the opposite direction causes movement of the floating cylinder and connected parts in the opposite direction.

If, after the power reverse lever 133 has been set and the reach rod 4 has been operated by the movement of the floating cylinder 30 to shift the reverse shaft arm 3 to adjust the link or other part of the valve gear (not shown) of the locomotive or other engine to the position desired, there should be a movement or displacement of any part of such valve gear or other part of the mechanism causing movement of the reach rod 4, such movement would in turn cause pivotal movement of the floating lever 61 about its point of connection with the front end of the power reverse reach rod 132. Such pivotal movement of the lever 61 would rock the shaft 122 thereby causing rocking movement of the arms 120 and 121 to actuate the proper inlet and outlet valves in the valve casing 82 to cause readjustment automatically of the floating cylinder 30 to return the reach rod 4 to the position to which it had been previously set and thus automatically return the reverse shaft arm 3 and the parts controlled thereby to the positions desired.

It will be noted that by reason of our construction the area of the exterior surface of the cylinder head or end 32 against which the air or other fluid under compression operates to move the cylinder 30 rearwardly to effect lifting of the link block is greater than the surface upon the opposite side of the said head interiorly of the floating cylinder 30. This is of considerable practical advantage in that it furnishes greater power for overcoming the greater resistance encountered when the link block and parts associated therewith are being lifted than is encountered when the parts are moved in the opposite direction.

The pipe 80 previously referred to is extended as indicated at 80ª and such extension may be employed to convey air or other fluid to any point where it may be desired to apply the same. In the present construction the pipe 80ª is connected through a valve structure at 80ᵇ to a pipe 80ᶜ which is connected at its end distant from the valve structure 80ᵇ to the nipple through which the opening 155 extends, so that fluid from the pipe 80ª may be employed to operate the plunger 140.

It will be apparent from the foregoing description, taken in connection with the drawings, that we have provided a power mechanism for actuating the reverse gear of a locomotive or other gear or mechanism which while comparatively simple in construction possesses great efficiency in operation. It will also be observed that we have provided a mechanism of the character stated which is adapted to be applied to standard reverse gear mechanisms already in use. It will also be apparent that we have provided a construction in which leakage between the chambers upon opposite sides of the head or end 32 of the floating cylinder 30 is absolutely prevented and that we thereby prevent a redistribution of pressure and movement of the gear to a position other than that desired. In other words, after the gear has once been set it stays or remains in the particular position to which set.

It will also be noted that we have provided a construction in which the valves for controlling the passage of air to and from the respective chambers situated upon opposite sides of the cylinder head or end 32 are entirely independent of each other and are capable of independent adjustments.

What we claim, and desire to secure by Letters Patent, is:

1. In a locomotive provided with a reverse gear, the combination of a reverse lever, a reach rod extending from said lever to the said reverse gear, means whereby the said lever may be disconnected from the said reach rod, a stationary cylinder, a floating cylinder having a closed end which projects into the said stationary cylinder, a stationary piston situated in the said floating cylinder, valve control means for regulating the inlet and outlet of a fluid under pressure into the said stationary and floating cylinders to effect reciprocal movements of the latter, and arms rigidly connected with and projecting laterally from said floating cylinder and having connection with said reach rod.

2. In power mechanism for controlling the reverse gear of a locomotive, the combination of a stationary cylinder, a movable cylinder operating within the said stationary cylinder, a stationary piston within said movable cylinder, a valve casing, means for supplying a fluid under pressure to said casing, valves arranged in couples in said casing, one valve of each couple being an inlet valve and the other valve thereof being an outlet valve, the said valves controlling the inlet and outlet of fluid to the chambers in said stationary cylinder and said movable cylinder, rocking arms supported within said casing, the outer ends of which are located between the valves of the respective couples for actuating the same, a lever having connection with the said arms for rocking the same, means for moving the said lever from normal position to rock the said arms to open an inlet valve of one couple and an outlet valve of the other, and connections between the said lever and the movable cylinder within the said stationary cylinder whereby movements of the said movable cylinder in either direction are effective to return the said valves to normal position.

3. In a locomotive, in combination, the reverse gear, a stationary cylinder, a floating cylinder therein which cooperates therewith to form a closed chamber, the said floating cylinder being provided with means whereby air tight contact between the said floating cylinder and the interior of the said stationary cylinder is effected, a stationary piston within the said floating cylinder which cooperates therewith to form a closed chamber, valves arranged in couples, each couple comprising an inlet and an outlet valve for controlling the inlet and outlet of fluid to and from one of the said chambers, means for simultaneously opening either an inlet or an outlet valve of one of the said couples and an outlet or an inlet valve of the other of said couples to effect movement of said floating cylinder in one direction or the other, means for connecting the said floating cylinder to the said reverse gear whereby movements of the said floating cylinder operate the said reverse gear, and means connecting the said floating cylinder with the said valve operating means whereby movements of the said cylinder return the valve operating means to normal position with the valves of each couple closed.

4. In a locomotive, in combination, a reverse gear, a stationary cylinder, a floating cylinder having a hermetically sealed end projecting into the said stationary cylinder, a stationary piston situated within the said floating cylinder, the said floating cylinder co-operating with the end of the stationary cylinder to form a chamber therein and the stationary piston co-operating with the end of the floating cylinder to form a chamber therein, passageways for supplying and conducting an operating fluid to and from the said chambers, a couple of valves in each passageway, one of which is an inlet valve for controlling the admission of fluid under pressure to the said chambers, and the other of which controls the outflow of fluid from the said chambers, a pivoted shaft situated intermediate the said valve couples, arms extending in opposite directions from the said shaft to positions intermediate the valves of the respective couples, an arm projecting from the said shaft, a lever pivoted intermediate its ends to the said arm, means connected to the said lever to effect pivotal movement thereof about a point beyond its point of connection to the arm of said shaft, such movement of said lever effecting pivotal movement of said shaft and of the said arms to open one of the valves of each couple, means for connecting the said floating cylinder to the said reverse gear whereby movement of said cylinder effects operation of the said gear, and means for connecting the said floating cylinder with said lever whereby movements of the said cylinder cause the return of said lever to normal position to permit the valves to return to closed position.

5. In power mechanism of the character described, the combination of a plurality of chambers, valves for controlling the ingress and egress of an operating fluid into and from the said chambers to effect relative movements of members co-operating to form the said chambers, the said valves being arranged in couples, a pivoted member arranged intermediate the said couples and having arms extending in opposite directions into positions intermediate the valves of the respective couples, a lever arm operatively connected with and angularly related to the said arms, a lever having pivotal connection at a point intermediate its ends to the said lever arm a distance from its point of connection with the said valve operating arms, means having connection with one end of the said lever for effecting pivotal movement thereof, the said lever swinging about a pivot at its opposite end, such movement operating to effect movement of the said arms to open one of the valves of each of the said couples, and means for connecting the movable one of said members with the last mentioned end of the said lever, whereby movement of said member causes pivotal movement of the said lever about a pivot at its opposite end to return the said lever arm and said valve operating arms to normal position.

6. In power mechanism of the character described, the combination of a plurality of relatively movable members which cooperate to form chambers in opposed relation with respect to each other, a valve casing, means for supplying a fluid under pressure to said casing, passageways leading from the said casing in opposite directions to the said chambers, valves arranged in couples and co-operating with each of the said passageways for controlling the ingress and egress of fluid to and from the said chambers, one of the valves of each of the said couples being an inlet valve and the other an outlet valve, a pivoted shaft mounted in the said casing and having arms extending in opposite directions into positions intermediate the valves of each of said couples, a lever arm depending from the said shaft, a floating lever pivoted intermediate its ends to the said depending lever arm, the lower end of said floating lever being connected to a movable pivot, manually operable means connected to the upper end of said floating lever, the said last mentioned means being adapted to cause swinging movement of said floating lever about the pivot at its lower end, said movement causing pivotal movement of the said shaft to effect simultaneously the opening of one of the valves of each of the said couples to permit the ingress of fluid to one of said chambers and the egress of fluid from the other thereof, to thereby effect relative movement between the relatively movable members of the said chambers, and means operatively connecting the movable one of said members with the pivot at the lower end of the said floating lever to effect movement of the said lever about its upper end as a pivot to cause the said shaft to return to normal position whereby the said valves are permitted to close.

7. In means for operating the reverse gear mechanism of a locomotive, the combination of a plurality of relatively movable members cooperating to form a plurality of chambers arranged in opposed relation with respect to each other, a plurality of valve couples for controlling the ingress and egress of operating fluid under pressure to and from the said chambers, a pivotal member located in intermediate relation to said valve couples and having arms projecting in opposite directions into positions between the valves of the respective valve couples and cooperating with the valves of said couples for actuating the latter, means for effecting pivotal movement of the said member, means for locking the said member against movement, and means which is manually operable when the said member is locked against movement for operating and controlling said reverse gear mechanism.

8. In power mechanism of the character described the combination of a plurality of relatively movable members which cooperate to form chambers for receiving an operating fluid under pressure, a plurality of valve couples for controlling the ingress and egress of fluid to and from the said chambers, pivoted means situated intermediate the said valve couples for simultaneously actuating one of the valves of each of the couples, and fluid actuated means for engaging with the said valve control means for locking the latter against pivotal movement.

9. In power mechanism of the character described, the combination of a plurality of relatively movable members which cooperate to form chambers situated in opposed relation with respect to each other, means for supplying a fluid under pressure for causing relative movement of the said movable members, a plurality of valves situated in the passageways leading to the respective chambers, one of the said valves in each passageway being an inlet valve and the other an outlet valve, the said valves being situated in opposed relation with respect to each other, a movable valve operating device having parts situated intermediate the valves of each couple, means for effecting movement of the said valve operating device to simultaneously actuate one of the valves of each of the couples, and fluid actuating means for locking the said device to prevent operation thereof.

10. In power mechanism of the character described, the combination of a plurality of relatively movable members which cooperate to form chambers situated in opposed relation with respect to each other, means for supplying a fluid under pressure to the said chambers for effecting relative movement of the said movable members, a plurality of couples of valves for controlling the ingress and egress of fluid to the said chambers, each couple comprising an inlet and an outlet valve, and each valve being provided with an adjustable extension, a rocking lever having parts extending into positions between said extensions, and means for locking the said lever to prevent movement thereof.

11. In power mechanism of the character described, the combination of a plurality of relatively movable members which cooperate to form chambers in opposed position with respect to each other, means for supplying fluid under pressure to either of said chambers to effect relative movement of the said members, a plurality of couples of valves for controlling the ingress and egress of the fluid to and from the said chambers, a movable device having parts adapted to actuate the valves of the said couples, means for locking the said movable device to prevent movement thereof, and adjustable means having connection with the said valves and co-operating with the said parts whereby the operative relation between the said valve operating parts and the said valves may be varied.

12. In power mechanism of the character described, the combination of a plurality of relatively movable members which cooperate to form chambers, said chambers being situated in opposed relation with respect to each other, means for supplying fluid under pressure to either of said chambers to effect relative movements between the said members in one direction or the other, a plurality of couples of valves for controlling the ingress and egress of operating fluid to and from the said chambers, one of the valves of each couple being an inlet valve and the other being an outlet valve, a movable device having parts situated in operative relation to the valves of the respective couples and being adapted to actuate either an inlet or an outlet valve of one couple and simultaneously an outlet or an inlet valve of the other couple, means for locking the said movable device against movement to prevent operation of said valves, the said outlet valves each being provided with an adjustable means adapted to be adjusted with relation to the said valve operating parts whereby the said outlet valves may be held in open position.

13. In means for operating the reverse gear mechanism of a locomotive, the combination of a plurality of relatively movable members which cooperate to form chambers arranged in opposed relation with respect to each other, means for supplying a fluid under pressure to either of said chambers to effect relative movement of the said members in one direction or the other, a plurality of valve couples for controlling the ingress and egress of fluid to and from said chambers, means for operating said valves, means for locking said operating means to prevent movement thereof, and means manually operable when said operating means is locked to control the operation of the said reverse gear mechanism.

14. In power mechanism of the character described, the combination of a stationary cylinder having a closed and open end, a cylinder having a closed end projecting into and adapted to reciprocate in said closed cylinder, a stationary piston situated in the said reciprocating cylinder, the said reciprocating cylinder co-operating with the closed end of the said stationary cylinder to form a closed chamber between the said two cylinders, and the said stationary piston co-operating with the closed end of the said reciprocating cylinder to form a closed chamber therein, means for supplying a fluid under pressure to either of said cylinders to effect movement of the said reciprocating cylinder in one direction or the other, a plurality of couples of valves for controlling the ingress and egress of said fluid to said cylinders, each couple comprising an inlet and an outlet valve, manually operable means for actuating a selected valve of each couple to permit a flow of fluid into one of the said chambers and an outflow of fluid from the other of said chambers to effect movement of the reciprocating cylinder in the stationary cylinder, a reverse gear, means for operatively connecting the said reverse gear to the said reciprocating cylinder whereby operation of the said reverse gear is effected by the reciprocating movements of the said reciprocating cylinder, means for rendering the manually operable means inoperable, means for holding the outlet valves in open position to permit free reciprocating movement of the said reciprocating cylinder, and manually operable means having connection with the said reverse gear for operating the same independently of the power reverse gear mechanism.

15. In a locomotive, in combination, a reverse gear, a manually operable lever, a reach rod connecting the said lever with the reverse gear mechanism, a stationary cylinder, a floating cylinder projecting into the said stationary cylinder, a stationary piston situated in said floating cylinder, means for supplying a fluid under pressure either to the said floating cylinder or to the said stationary cylinder to effect movement of the former in either direction, a connection between the said floating cylinder and the said reach rod whereby movements of said floating cylinder effect movements of the said reach rod to control the said reverse gear, valves for controlling the ingress and egress of fluid to and from the said cylinders, manually operable means for opening selected valves for permitting an ingress of fluid to one of said cylinders and the egress thereof from the other of said cylinders, means for operatively connecting the said floating cylinder with a part of the said manually operable means whereby movements of said cylinder effect movement of said part to permit closing of the said valves, and means for rendering the said lever or the said manually operable means for controlling the said valves inoperable whereby the said reverse gear may either be manually controlled or controlled by the power reverse gear mechanism.

16. In power mechanism of the character described, the combination of a plurality of relatively movable members which cooperate to form chambers, a plurality of fluid passageways communicating with said chambers, inlet and outlet valves for controlling the passage of an operating fluid to and from the said chambers, valve actuating means, means for locking the valve actuating means in stationary position, and adjustable means intermediate the said valve actuating means and the outlet valve for holding the latter open when the said valves actuating means is in locked position.

17. In power mechanism of the character described, the combination of a plurality of relatively movable members which cooperate to form chambers arranged in opposed relation with respect to each other, a plurality of valve couples for controlling the ingress and egress of operating fluid to and from said chambers, pivotal means interposed between and co-operating with the valves of said couples for actuating the latter, means for effecting pivotal movement of the said valve actuating means, means for rendering the said power reverse gear mechanism inoperative, means for locking the said valve actuating means against movement when the said power reverse gear mechanism has been rendered inoperative, and manually operable reverse gear mechanism which may be operated when the said power reverse gear mechanism is inoperative.

18. In power mechanism of the character described, the combination of a stationary cylinder closed at one end and open at the other, a reciprocable cylinder closed at one end and open at the other, the closed end of which projects into the said stationary cylinder and forms a chamber with the closed end thereof, a stationary piston extending into the open end and situated within said reciprocable cylinder, the said piston forming with the closed end of said reciprocable cylinder a chamber, conduits for conveying a fluid to and from the said chamber, the said conduits terminating at their outer ends in a valve casing having passageways therethrough, inlet and outlet valves arranged in couples for controlling the passage of a fluid to and from the said conduits, a rocking lever for actuating the said valves, said rocking lever being provided with an arm extending laterally therefrom, a lever pivoted intermediate its ends to said arm, the said lever being connected at one end to a fulcrum pin, and connections between the opposite end of said lever and the said reciprocable cylinder whereby movements of the latter are adapted to actuate the said rocking lever for controlling the said valves.

In testimony that we claim the foregoing as our invention, we have hereunto signed our names this sixth day of October, A. D. 1920.

EDMOND C. KARIBO.
EDWIN S. PEARCE.
RAYMOND W. RETTERER.